United States Patent [19]

Hara

[11] Patent Number: 5,376,872

[45] Date of Patent: Dec. 27, 1994

[54] CONTROL DEVICE FOR VOLTAGE TYPE PULSE WIDTH MODULATION INVERTER

[75] Inventor: Akira Hara, Kawasaki, Japan

[73] Assignee: Fuji Electric Co., Ltd., Kawasaki, Japan

[21] Appl. No.: 53,769

[22] Filed: Apr. 29, 1993

[51] Int. Cl.⁵ .............................................. H02P 7/62
[52] U.S. Cl. ..................................... 318/799; 318/811; 363/41
[58] Field of Search ............... 318/798, 799, 800, 801, 318/807, 808, 809, 810, 811, 812; 307/265; 332/106, 109, 110; 363/41, 97

[56] References Cited

U.S. PATENT DOCUMENTS

| | | | |
|---|---|---|---|
| 4,510,430 | 4/1985 | Ashikaga et al. | 318/800 |
| 4,562,524 | 12/1985 | Matoh et al. | 363/41 |
| 4,617,675 | 10/1986 | Ashikaga et al. | 363/41 X |
| 5,038,092 | 8/1991 | Asano et al. | 318/811 |

*Primary Examiner*—Bentsu Ro
*Attorney, Agent, or Firm*—Kanesaka & Takeuchi

[57] ABSTRACT

In case an induction motor is controlled by a voltage type PWM inverter, reduction of an electromagnetic noise is made without enlarging a device.

By providing an integrator 8 for obtaining an inverter phase angle by integrating an inverter frequency command and a carrier frequency modulator 9 for modulating so as to raise a frequency of a modulation signal for only a certain angle in the center of every 60 degrees of the phase angle, a magnetic flux vector can be brought closer to a locus of a circle so as to reduce the electromagnetic noise more than that of a conventional one.

1 Claim, 4 Drawing Sheets

CONTROL DEVICE FOR VOLTAGE TYPE PULSE WIDTH MODULATION INVERTER

BACKGROUND OF THE INVENTION AND RELATED ART STATEMENT

This invention relates to a control device for a voltage type PWM inverter for reducing noises when an induction electric motor (hereinafter simply called as "induction motor") is driven by the voltage type PWM inverter at a variable speed.

Recently, there has been increasing a tendency for the induction motor to be driven at the variable speed by using the voltage type PWM inverter, and, at present, the induction motors have been used in private facilities such as airconditioning equipments of buildings. In this manner, when the induction motors are started to be used near people, electromagnetic noises of the induction motors generated by driving the inverters are highlighted.

In FIG. 5, a structure of a general voltage type PWM inverter is shown, and in FIG. 6, signal waveforms of respective parts thereof are shown. Incidentally, in FIG. 5, reference numeral 1 is a sine-wave generator, 2 is a delta-wave generator, 3 is a comparator, 4 is an inversion device, 5 is a base driving circuit, 6 is a voltage type inverter and 7 is an induction motor (IM).

More specifically, the sine-wave generator 1 generates a sine-wave control signal, as shown by (a) in FIG. 6, from an inverter frequency command $f_m$ and a voltage command $V_m$, and the delta-wave generator 2 outputs a delta-wave modulation signal $S_m$, as shown by (b) in FIG. 6, from a carrier frequency command $f_c$. The comparator 3 compares (counts in a binary system) these signals, and, based on the result, a switching element of the voltage type inverter 6 is turned on and off through the base driving circuit 5 to obtain outputs as shown by (c) in FIG. 6, so that the induction motor 7 is driven at a variable speed.

As mentioned above, since a pulse-like voltage is supplied from the voltage type PWM inverter to the induction motor, a special noise which is called an electromagnetic noise is generated from the induction motor. Incidentally, it has been known that a carrier frequency component dominates when the noise is subjected to a frequency analysis. Thus, as a countermeasure thereof, it may be adopted that a switching frequency (or a carrier frequency) of PWM is raised by using a high speed switching element such as IGBT (Insulated Gate Bipolar Mode Transistor) and MOSFET (MOS-type Field Effect Transistor), so that the electromagnetic noise is moved outside an audible range. However, by doing so, there are problems such that loss of the switching element accompanying the rise of the switching frequency is increased as well as a cooling fan must be enlarged. Further, there is another problem that, due to an increase in cost, an application thereof is limited to a specific field.

Therefore, a subject of the present invention is to reduce the electromagnetic noise without enlarging the device.

SUMMARY OF THE INVENTION

In order to solve the problems, in the present invention, in a control device for a voltage type PWM inverter including at least a signal generator for generating a sine-wave control signal from a voltage command and a frequency command and a comparator for comparing the sine-wave control signal and a modulation signal, and based on a compared result, controlling, in pulse width modulation (PWM), a voltage type inverter for driving an induction motor, it is characterized in that there are provided an integrator for integrating the frequency command, and a modulator for modulating to raise a frequency of the modulation signal for only a certain angle in the center of every 60 degrees of a phase angle of the control signal based on an output of the integrator.

Reduction of the electromagnetic noise is designed by raising the frequency of the modulation signal for only a certain angle in the center of every 60 degrees of the phase angle of the control signal for a pulse width modulation.

DETAILED DESCRIPTION OF A PREFERRED EMBODIMENT

Figure 1:
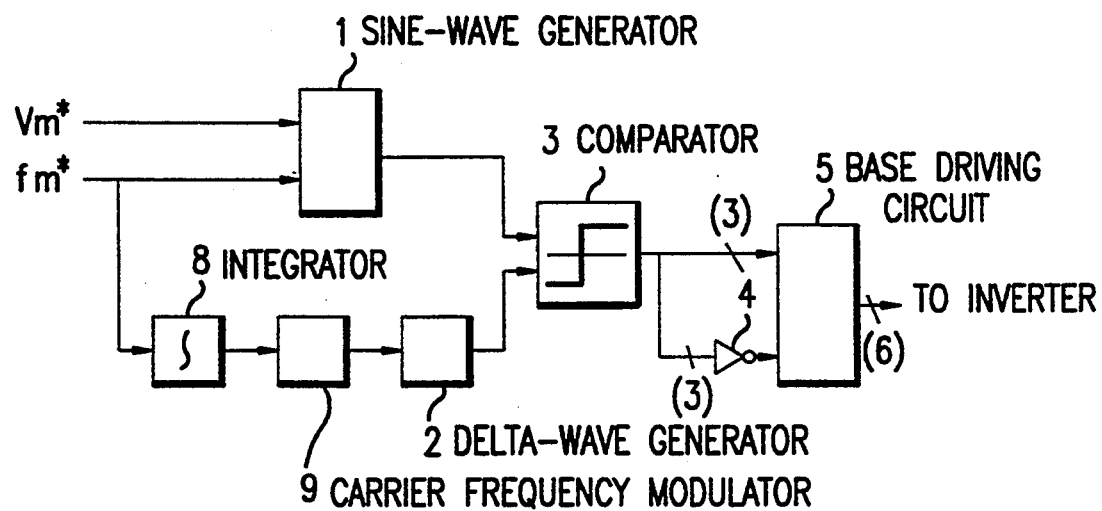
FIG. 1 is a block diagram of an essential part showing an embodiment of the present invention.
Figure 5:
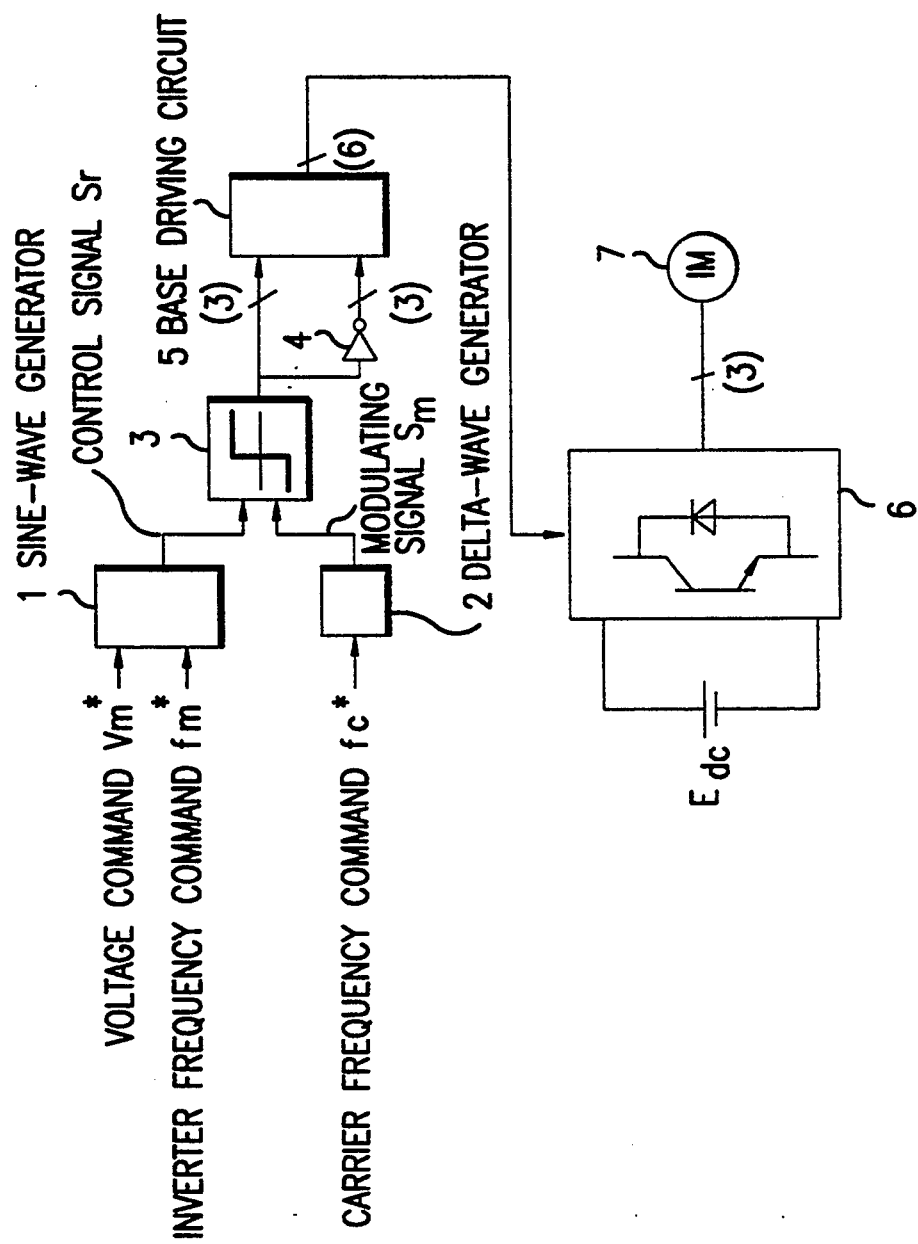
FIG. 5 is a structural diagram showing a general example of a voltage type PWM invertor.
Figure 6:
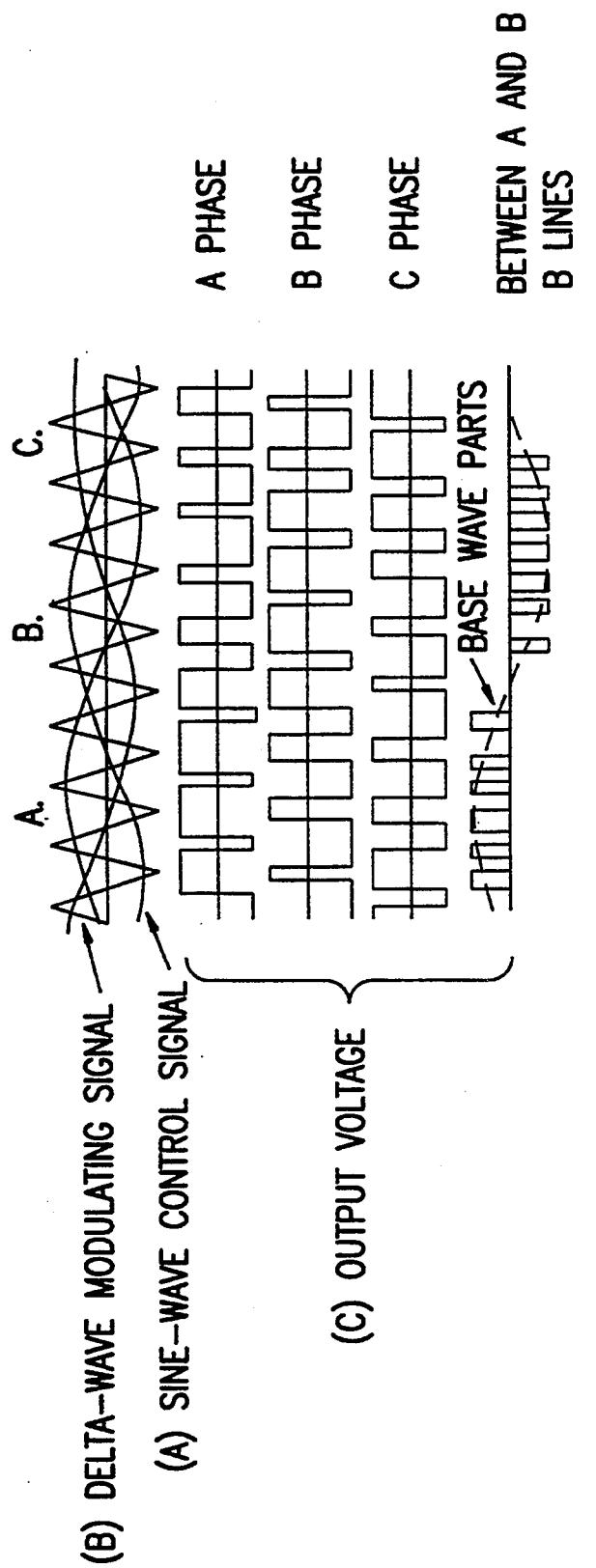
FIG. 6 is a waveform diagram showing waveforms of respective parts in FIG. 5.

An embodiment of the present invention is shown in FIG. 1. The embodiment is composed of an integrator 8 and a carrier frequency modulator 9 in addition to a conventional example shown in FIG. 5. The other parts are the same as in FIG. 5.

More specifically, the integrator 8 integrates an inverter frequency command $f_m$ to convert into an inverter phase angle $\Theta_m$, and the phase synchronizes with a phase of a control signal. The carrier frequency modulator 9 receives an inverter phase angle $\Theta_m$, and changes a carrier frequency in accordance with the phase angle. The output thereof becomes a carrier frequency command $f_c$, and the operation thereafter is the same as in FIG. 5.

Figure 2:
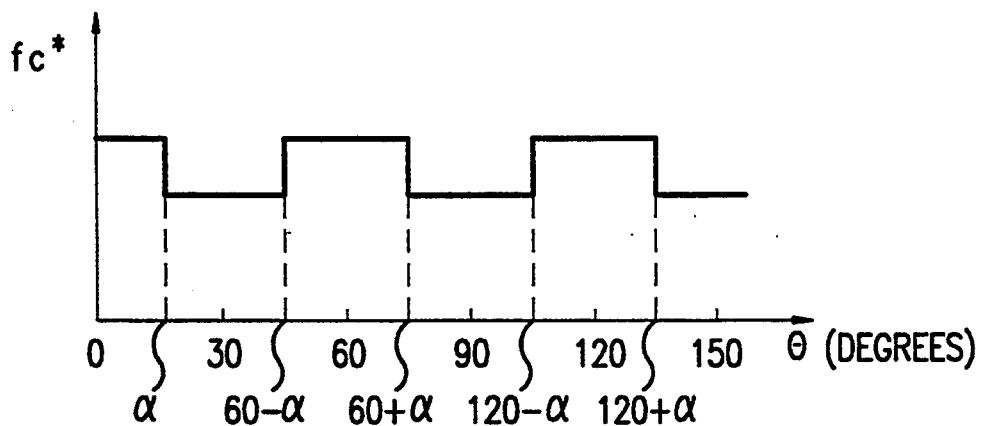
FIG. 2 is a characteristic diagram for explaining a characteristic example of a carrier frequency modulator.

The carrier frequency modulator 9, for example, as shown in FIG. 2, has a characteristic to raise the carrier frequency command $f_c$ for only $\pm \alpha$ degrees ($\alpha \leq 30$ degrees) in the center of every 60 degrees such as 0 degree, 60 degrees, 20 degrees, . . . Here, the frequency between the angles is shown to be continuous and uniform values, but they may be discontinued and inclined at some angle.

Next, in the characteristic of the carrier frequency modulator, the ground for raising the carrier frequency command $f_c$ for only $\pm \alpha$ degrees ($\alpha \leq 30$ degrees) in the center of 0 degree, 60 degrees, 120 degrees, . . . is described hereinbelow.

Now, when a voltage obtained by a PWM pattern is expressed in terms of a space vector, there are eight kinds in total including six kinds of voltage vectors and two kinds of zero vectors. When the voltage is shown by a formula, it comes to formula 1.

[Formula 1]

$$v_i = v_a + a^2 v_b + a v_c (a = e^{j2\pi/3},\ i = 0, 1, \ldots 7)$$

While change in a magnetic flux vector is shown in formula 2.

$$\Delta \lambda = \int_0^t v_i\, d\tau = |v_i|\, t$$

$$(i = 0, 1, \ldots 7)$$

Figure 3:
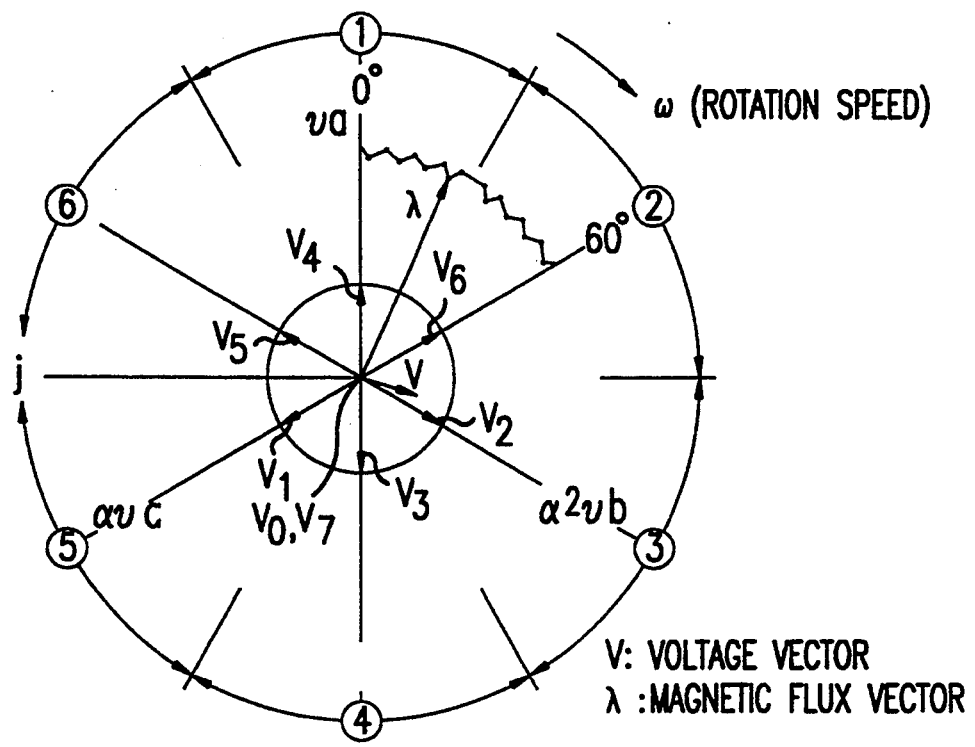
FIG. 3 is an explanatory diagram for explaining a relationship between a voltage vector and a magnetic flux vector.

Also, since the magnetic flux vector delays by 90 degrees with respect to the voltage vector, in view of a locus of the magnetic flux vector formed by the voltage vector, these vectors are expressed as shown in FIG. 3, and voltage vectors used in respective zones in FIG. 3 become as shown in Table 1.

TABLE 1

| Zones | | | | | |
|---|---|---|---|---|---|
| ① | ② | ③ | ④ | ⑤ | ⑥ |
| Selected Vectors | | | | | |
| 6 | 2 | 3 | 1 | 5 | 4 |
| 2 | 3 | 1 | 5 | 4 | 6 |
| 0 | 0 | 0 | 0 | 0 | 0 |
| 7 | 7 | 7 | 7 | 7 | 7 |

Figure 4:
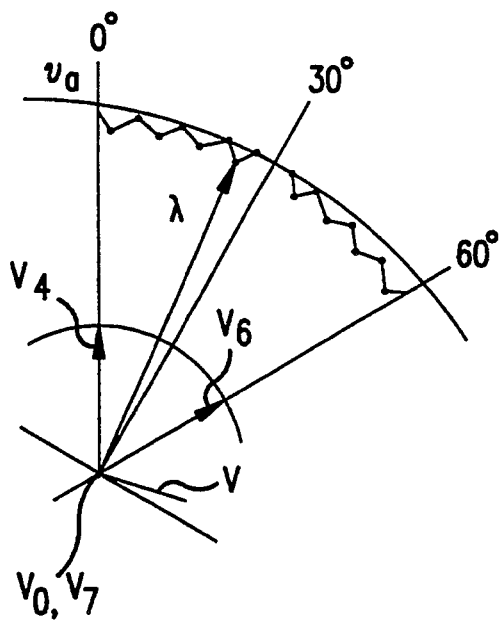
FIG. 4 is an explanatory diagram for explaining a principle of the invention.

Incidentally, it is pointed out that as the locus of the magnetic flux vector shown in FIG. 3 is brought closer to a circle, it is likely to be available in commercial driving, and its noise can be reduced. Therefore, when a part of FIG. 3 is enlarged as shown in FIG. 4, and dispersions of the locus of the magnetic flux vector at the time of PWM control and the locus of a circle are observed, the difference between the two becomes the smallest in the vicinity of a ½ equally parted angle (here, 30 degrees) in each zone of every 60 degrees, and becomes the largest at 0 degree and 60 degrees. This is because in the vicinity of 30 degrees, there is a voltage vector in a direction of a line contacted with the circle which is a progressing direction of the magnetic flux vector, while, in the vicinity of 0 degree and 60 degrees, the magnetic flux vector is rotated by a zero vector, and two voltage vectors forming an angle of 60 degrees with respect to the magnetic flux vector. Incidentally, the relationship is also applied to respective zones of every 60 degrees such as 0–60 degrees, 60 degrees –120 degrees . . . Therefore, generally, by raising the carrier frequency in a range of $$\theta = n\cdot\pi/3 \sim n\cdot\pi/3 \pm \pi/6 (n = 0, 1, \ldots 5)$$

the locus of the magnetic flux vector can be brought closer to the locus of the circle.

According to the present invention, in case the induction motor is controlled by the voltage type PWM inverter, the carrier frequency is raised for only a certain angle in the center of every 60 degrees where the magnetic flux vector parts from the locus of the circle, whereby the locus of the magnetic flux vector can be brought closer to the locus of the circle. As a result, without use of IGBT and MOSFET which are high speed switching elements, and without enlarging a cooling fan, the electromagnetic noise can be reduced easily and inexpensively.

I claim:

1. In a control device for a voltage type PWM inverter including at least a signal generator for generating a sine-wave control signal by a voltage command and a frequency command, and a comparator for comparing said sine-wave control signal and a modulation signal, and based on a compared result, said control device controlling, in pulse width modulation (PWM), the voltage type inverter for driving an induction motor, said control device of the voltage type PWM inverter being characterized in that the control device includes an integrator for integrating said frequency command, and a modulator for modulating to raise a frequency of said modulation signal for only a predetermined angle in center of every 60 degrees of a phase angle of said control signal based on an output of the integrator.

* * * * *